US007687714B2

(12) United States Patent
Deterre et al.

(10) Patent No.: US 7,687,714 B2
(45) Date of Patent: Mar. 30, 2010

(54) SHIELDED AND SEALED ELECTRIC HARNESS

(75) Inventors: Geoffray Deterre, Le Kremlin Bicetre (FR); Pascal Henrioux, Saint Mammes (FR); Anthony Lorand, Vernon (FR); Pascal Pelisson, Le Chatelet en Brie (FR)

(73) Assignee: Hispano Suiza, Colombes (FR)

( * ) Notice: Subject to any disclaimer, the term of this patent is extended or adjusted under 35 U.S.C. 154(b) by 331 days.

(21) Appl. No.: 11/748,853

(22) Filed: May 15, 2007

(65) Prior Publication Data

US 2007/0270037 A1 Nov. 22, 2007

(30) Foreign Application Priority Data

May 19, 2006 (FR) .................................. 06 04487

(51) Int. Cl.
*H02G 3/00* (2006.01)

(52) U.S. Cl. .................................. 174/72 R; 174/72 A

(58) Field of Classification Search ............... 174/74 R, 174/74 A, 76, 78, 79, 82

See application file for complete search history.

(56) References Cited

U.S. PATENT DOCUMENTS

| | | | | |
|---|---|---|---|---|
| 4,693,323 | A * | 9/1987 | Owensby | 174/359 |
| 4,766,267 | A * | 8/1988 | Gray et al. | 174/36 |
| 4,786,757 | A * | 11/1988 | Owensby et al. | 174/359 |
| 4,896,000 | A * | 1/1990 | Procter et al. | 174/74 R |
| 5,399,808 | A * | 3/1995 | Carter et al. | 174/80 |
| 5,571,992 | A * | 11/1996 | Maleski et al. | 174/36 |
| 5,619,015 | A * | 4/1997 | Kirma | 174/84 R |
| 6,066,800 | A * | 5/2000 | Renaud | 174/36 |
| 6,143,986 | A | 11/2000 | Anderson et al. | |
| 6,423,952 | B1 | 7/2002 | Meisiek | |
| 2001/0011601 | A1* | 8/2001 | Renaud | 174/102 R |

FOREIGN PATENT DOCUMENTS

| | | | |
|---|---|---|---|
| EP | 0 238 203 | A2 | 9/1987 |
| EP | 0 693 811 | A1 | 1/1996 |
| EP | 1 091 623 | A2 | 4/2001 |

* cited by examiner

*Primary Examiner*—William H Mayo, III
(74) *Attorney, Agent, or Firm*—Oblon, Spivak, McClelland, Maier & Neustadt, L.L.P.

(57) ABSTRACT

A shielded and sealed electric harness having conductors housed in a tubular structure providing protection and shielding, the structure being constituted by a tubular inner textile braid, an intermediate metal tubular braid for electromagnetic shielding, and a corrugated outer sheath having its end adhesively bonded to a heat-shrink endpiece for fastening onto a portion of a connector of a branch joint.

13 Claims, 1 Drawing Sheet

SHIELDED AND SEALED ELECTRIC HARNESS

The invention relates to a shielded or double-shielded electric harness with two sealing barriers for zones in which the environment is severe in terms of temperature, vibration, and electromagnetic disturbances, such as, for example, inside a turbojet or a turboprop engine.

FIELD OF THE INVENTION

A harness of this type comprises a set of electric cables and wires that serve, for example, to provide connections between various pieces of electrical equipment such as a system for electronically regulating the engine, or sensors.

BACKGROUND OF THE INVENTION

At present, two different technologies are used for assembling electric harnesses, depending on the temperatures that exist in their zones of use. When the maximum temperature in said zones does not exceed 150° C., the electrical connection wires and cables are generally protected by means of a structure comprising a textile braid forming a first layer protecting the electric wires and cables, a tubular braid surrounding the textile braid and providing electromagnetic shielding, and an outer sheath of heat-shrink polymer and having, at its end, an endpiece made of a heat-shrink polymer and serving both to protect the end of the shielding braid on the tubular metal or composite connection part and also to connect with the outer sheath of that connection part. That structure has the advantage of accommodating relatively short radii of curvature, but its ability to withstand temperature is limited to 150° C.

In zones where the temperature is higher and might reach a peak value of 260° C., the electric wires and cables are protected by a tubular structure that comprises an inner sheath of polytetrafluoroethylene (PTFE), a metal braid for electromagnetic shielding surrounding said sheath, and a textile braid surrounding the shielding braid and made of a material that withstands high temperatures, e.g. aramid fibers, the end of said structure being held by a mechanical collar against a metal or composite connection part.

The drawback of that structure is that it is heavier than the preceding structure and does not accept short radii of curvature.

OBJECTS AND SUMMARY OF THE INVENTION

An object of the present invention is to provide a single structure for protecting and connecting electric wires and cables of the above-mentioned type, that does not present the drawbacks of known structures, that can be used equally well in zones having a maximum temperature of about 150° C. and in zones where the peak temperature can reach 260° C., and that accepts relatively short radii of curvature.

To this end, the invention provides a shielded and sealed electric harness, in particular for an airplane engine, comprising a set of conductor elements fitted at their ends with connectors or branch joints, each conductor element comprising at least one electrically conductive wire or cable mounted in a tubular protective and shielding structure that comprises a tubular inner textile braid and an intermediate metal braid for electromagnetic shielding, wherein the tubular structure also comprises a corrugated outer sheath made of polymer, surrounding the intermediate metal braid and having at least one end secured to a tubular endpiece of heat-shrink material, said tubular endpiece enabling the outer sheath to be fastened onto a connector or a branch joint, and serving to clamp and secure one end of the intermediate metal braid, by means of a metal collar or ferrule onto a tubular metal part of the connector or of the branch joint.

The outer sheath is made of a material that withstands high temperatures, e.g. PTFE, and its corrugated structure enables it to accept short radii of curvature.

The endpiece of heat-shrink material that is fastened to the end of said outer sheath serves to fasten the sheath onto a connector or a branch coupling. The end of the shielding metal braid is clamped against said connector or coupling, advantageously by means of a metal ferrule or of an optionally electrically conductive collar so as to provide continuity of the electromagnetic shielding.

In a preferred embodiment of the invention, the end of the outer sheath, when made of PTFE, is treated chemically so as to be capable of being adhesively bonded to the endpiece made of heat-shrink material, e.g. by means of an epoxy adhesive.

The heat-shrink endpiece is made of a plastics material that withstands high temperatures, in particular such as a fluorinated elastomer sold under the Viton trademark, or a silicone elastomer. The ferrule or the collar for clamping the end of the shielding metal braid on the connector or the coupling is made of stainless steel or of copper-nickel alloy, the shielding metal braid advantageously being made of copper-nickel alloy.

The metal part of the connector or the coupling against which the end of the shielding metal braid is clamped is itself preferably made of titanium, which material is selected because of its light weight and its mechanical characteristics.

In order to ensure continuity of the electromagnetic shielding, the titanium part may be given surface treatment, e.g. receiving a layer of nickel that is deposited by a chemical technique.

The textile tubular protection braid is preferably made of aramid fibers, such as those sold under the Nomex trademark.

In general, the harness of the invention presents the advantage of a weight saving of about 20% relative to previously-used technologies. Furthermore it is intended for use equally well in medium temperature zones and in high temperature zones. This results in a simplification to the fabrication of such harnesses in terms of supply and assembly of their components.

BRIEF DESCRIPTION OF THE DRAWING

The invention can be better understood and other details, characteristics, and advantages thereof appear more clearly on reading the following description made by way of example with reference to the accompanying drawing, in which.

MORE DETAILED DESCRIPTION

Figure 1:
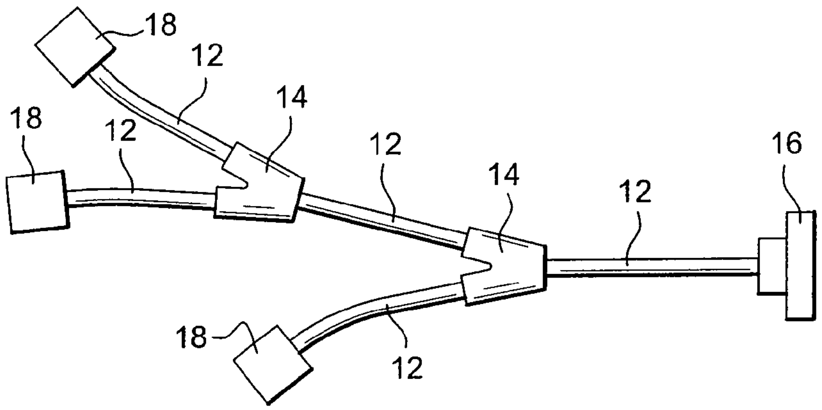
FIG. 1 is a diagrammatic view of an electric harness for an airplane engine.

The harness 10 shown in FIG. 1 comprises a certain number of conductor elements 12 that are interconnected by branch joints 14 and that have a connector 16 at the end of the harness for connection to an electronics system, and connectors 18 for connection to sensors installed in various zones of an airplane engine, e.g. in the zone of a fan mounted at the inlet of a turbojet and in the zone of the compressor of said turbojet.

More precisely, the harness of FIG. 1 comprises a first conductor element 12 having one end fitted with the connector 16 for connection to the electronic system, and having its other end connected via a branch joint 14 to two other conductor elements 12, one of which is fitted at one end with a connector 18 for connection to a sensor and the other of which is connected via another branch joint 14 to two other conductor elements 12 in turn fitted with connectors 18 for connection to sensors.

Figure 2:
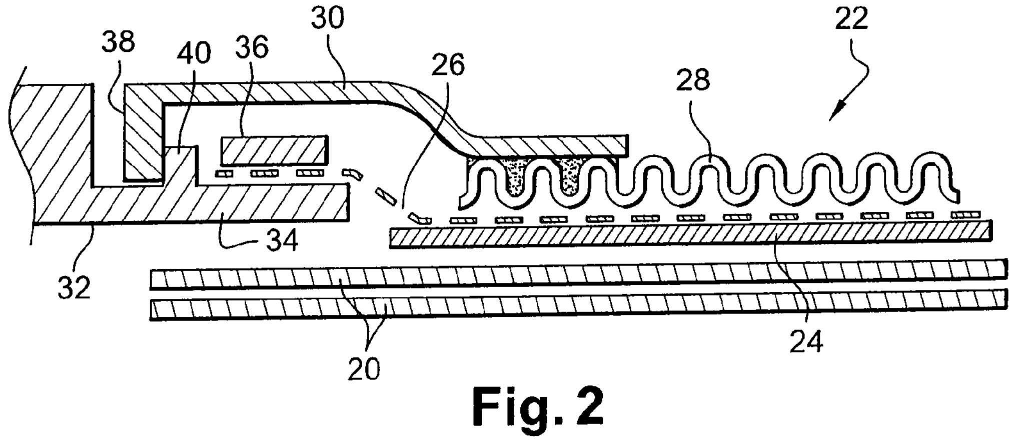
FIG. 2 is a diagrammatic axial half-section view of the end of a conductor element of the harness.

As can be seen more clearly in FIG. 2, each conductor element 12 comprises one or more electrically conductive wires or cables 20 for transmitting electrical signals between the electronic system and the sensors mounted on the engine, this or these electrically conductive wires or cables being mounted in a tubular protective structure 22 that also provides sealing and that is connected at its ends to a connector 16 or 18 and to a branch joint 14.

According to the invention, the structure 22 comprises a tubular inner textile braid 24 surrounding the conductor(s) 20, a metal tubular braid 26 providing electromagnetic shielding, which braid surrounds the inner textile braid 24, and an outer sheath 28 of corrugated shape, surrounding the shielding metal braid 26.

The inner textile braid 24 is made of aramid fibers of the type sold under the Nomex trademark.

The shielding braid is made of nickel-plated copper, and the outer sheath 28 is made of PTFE.

The end of the sheath 28 is fastened, advantageously by bonding by means of an epoxy adhesive, onto the end of a cylindrical endpiece 30 of heat-shrink plastics material, such as a fluorinated elastomer of the type sold under the Viton trademark, or in a variant a silicone elastomer.

In order to enable it to be adhesively bonded to the endpiece 30, the end of the sheath 28 is subjected to chemical treatment of the sodium ammonia type for eliminating structure fluorine atoms from the sheath.

The heat-shrink endpiece 30 surrounds the end of a cylindrical part 32 that is preferably made of titanium, that is secured to a connector 16 or 18, and that includes a cylindrical tail 34 onto which the end of the metal braid 26 is clamped by means of a metal collar or ferrule 36 of stainless steel, in turn covered by the heat-shrink endpiece 30.

In order to enable the titanium part 32 to provide continuity of electromagnetic shielding, its surface is coated in a layer of chemically-deposited nickel, with the end of the metal braid 26 being clamped thereagainst by the metal collar or ferrule 36.

The end of the endpiece 30 remote from the outer sheath 28 includes an inner annular rim for catching an outer annular rim 40 on the cylindrical tail 34 of the part 32.

What is claimed is:

1. A shielded and sealed electric harness, comprising:

a set of conductor elements fitted at their ends with connectors or branch joints, each conductor element comprising at least one electrically conductive wire or cable mounted in a tubular protective and shielding structure, the tubular protective and shielding structure comprising:

a tubular inner textile braid, an intermediate metal braid for electromagnetic shielding, and a corrugated outer sheath made of non-heat-shrink polymer, said corrugated outer sheath surrounding the intermediate metal braid and having at least one end secured to a tubular endpiece of heat-shrink material, wherein said tubular endpiece enables the outer sheath to be fastened onto a connector or a branch joint, and wherein one end of the intermediate metal braid is clamped and secured onto a tubular metal part of the connector or of the branch joint by a metal collar or ferrule.

2. A harness according to claim 1, wherein the outer sheath includes polytetrafluoroethylene.

3. A harness according to claim 2, wherein the end of the outer sheath is chemically treated to enable it to be adhesively bonded onto the endpiece of heat-shrink material.

4. A harness according to claim 1, wherein the heat-shrink includes a fluorinated elastomer of the Viton type, or of silicone.

5. A harness according to claim 1, wherein the collar or ferrule which clamps and secures the end of the metal braid on the metal part includes stainless steel or copper-nickel alloy.

6. A harness according to claim 1, wherein the intermediate metal braid includes copper-nickel alloy.

7. A harness according to claim 1, wherein the metal part includes titanium.

8. A harness according to claim 7, wherein the metal part receives an electrically conductive surface coating so as to provide continuity of electromagnetic shielding.

9. A harness according to claim 1, wherein the inner textile braid includes aramid fibers.

10. A harness according to claim 1, wherein said corrugated outer sheath comprises corrugations defining with the intermediate metal braid at least one internal annular empty space.

11. A harness according to claim 1, wherein said corrugated outer sheath is elastically deformable or flexible.

12. A shielded and sealed electric harness, comprising:

a set of conductor elements fitted at their ends with connectors or branch joints, each conductor element comprising at least one electrically conductive wire or cable mounted in a tubular protective and shielding structure, the tubular protective and shielding structure consisting of:

a tubular inner textile braid, an intermediate metal, braid for electromagnetic shielding, and a corrugated outer sheath made of non-shrink polymer, said corrugated outer sheath surrounding said intermediate metal braid and having at least one end secured to a tubular endpiece of heat-shrink material, wherein said tubular endpiece enabling the outer sheath to be fastened onto a connector or a branch joint, and wherein one end of the intermediate metal braid is clamped and secured onto a tubular metal part of the connector or of the branch joint by a metal collar or ferrule.

13. A harness according to claim 3, wherein the end of the outer sheath is chemically treated with sodium ammonia.

* * * * *